Patented June 16, 1953

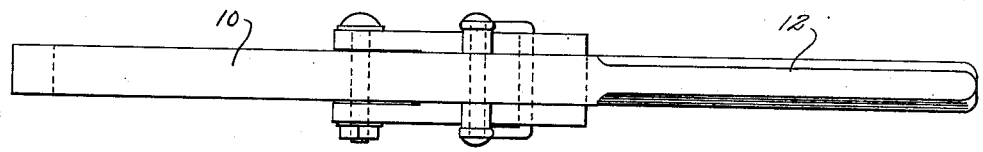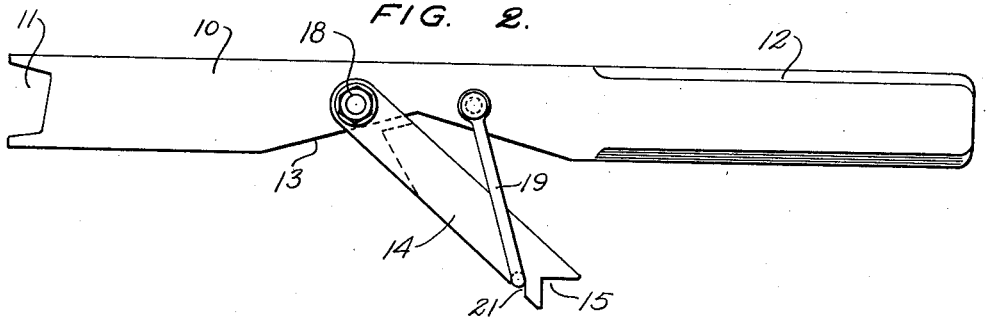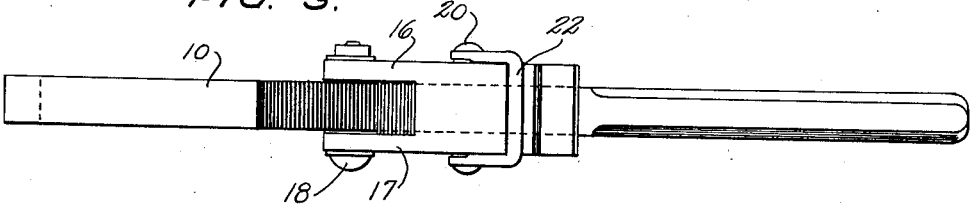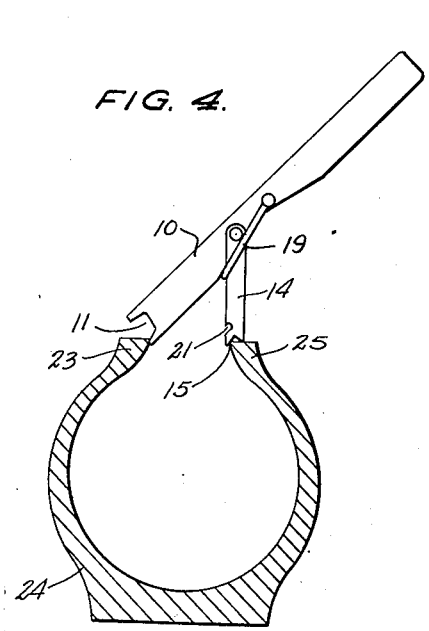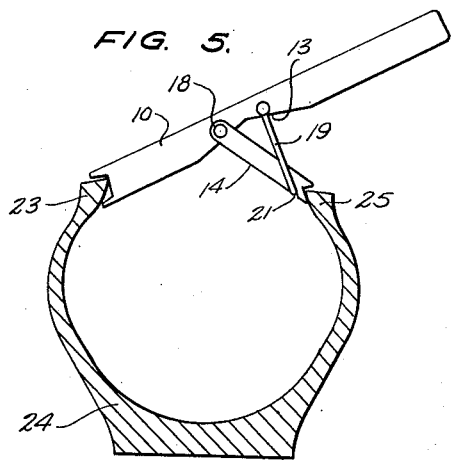

2,642,264

UNITED STATES PATENT OFFICE 2,642,264

TIRE CASING SPREADER

Warren R. Perry, Fredericksburg, Va.

Application April 6, 1951, Serial No. 219,608

1 Claim. (Cl. 254—50.1)

This invention relates to tire casing spreaders and more particularly to a spreader in the form of a hand tool which can be releasably locked in open condition while in engagement with a tire casing.

It is among the objects of the invention to provide an improved tire casing spreader which can be easily and firmly engaged with the beads of a tire casing and manually operated to force the casing beads apart to spread the casing; which can be positively locked in open condition to hold the tire casing spread against accidental release to avoid danger to the hands of the operator; which can be applied to various size casings and can be applied singly or in multiple to hold a part or all of the casing in spread condition; and which is simple and durable in construction, economical to manufacture and easy to use.

Other objects and advantages will become apparent from a consideration of the following description and the appended claim in conjunction with the accompanying drawing wherein:

Figure 1 is a top plan view of a tire casing spreading tool illustrative of the invention;

Figure 2 is a side elevational view of the tool illustrated in Figure 1;

Figure 3 is a bottom plan view of the tool illustrated in Figures 1 and 2;

Figure 4 is a somewhat diagrammatic illustration showing the tool in operative association with a tire casing to spread the casing; and Figure 5 is a view similar to Figure 4, but showing the tool locked in open position holding the casing in spread condition.

With continued reference to the drawing, the tool comprises a shaft 10 of elongated, rectangular shape in transverse cross section having a transversely extending notch 11 in one end thereof to engage a tire casing bead. At the side of its mid-length location remote from the notch 11 the edges of the bar or shaft 10 are beveled off or rounded, as indicated at 12, to provide at this end of the bar a handle formation. Intermediate its length the shaft 10 is also provided with a notch or recess 13 of shallow, V-shaped form at the inner end of the handle portion.

A lever 14 of elongated, rectangular shape in transverse cross section is provided in one end with a notch 15 for engaging a tire casing bead opposed to the bead engaged in the notch 11 and this lever has at its other end a bifurcated formation providing two spaced apart lugs 16 and 17. The portion of the shaft 10 in which the notch 13 is provided is received in the bifurcated portion of the lever 14 between the lugs 16 and 17 and a pivot pin 18 extends through registering apertures in the lugs 16 and 17 near the outer ends of these lugs and in the shaft 10 to pivotally connect the lever to the shaft. The pivot pin 18 is spaced from the notched end of the shaft 10 a distance substantially equal to the length of the lever 14 and the length of the lever 14 is slightly greater than one half the distance between the beads of a tire casing when the casing is in opened or spread condition, as illustrated in Figure 5.

A wire loop or bail 19 is pivotally secured at one end to the shaft 10 between the pivot pin 18 and the adjacent end of the handle formation of the shaft and at a location spaced from the pivot pin and extends around the lever 14. This bail may have suitable eye formations at the ends of its legs at the open end of the bail and a pivot pin or rivet 20 may extend through these eye formations and through the transverse aperture in the shaft 10 to pivotally secure the bail to the shaft. The lever 14 is provided with a transversely extending groove 21 in the side thereof adjacent the notched end of the shaft and near the notched end of the lever which groove receives the intermediate or bight portion 22 of the bail to lock the lever relative to the shaft in position to hold a tire casing in spread condition, as illustrated in Figures 2 and 5.

In using the tool to spread a tire casing, with the bail 19 released from the groove 21 in the lever 14, the notch 11 in the shaft 10 is engaged with one bead 23 of a tire casing 24 and the notch 15 in the distal end of the lever 14 is engaged with the other bead 25 of the tire casing. Manual pressure is now applied to the handle portion of the shaft 10 forcing the notched ends of the shaft and lever apart and thereby forcing the beads 23 and 25 in the tire casing apart to spread the casing. As soon as the tire beads have been moved apart a predetermined distance, the bail 14 is engaged in the groove 21 in the lever to lock the lever in its casing spreading position relative to the shaft so that the casing will be positively held in spread condition, as illustrated in Figure 5, against accidental release.

If it is desired to spread the casing over a large angular extent, the first tool may be left in spreading engagement with the casing and a second tool applied to the casing at a location spaced from the first tool and locked in casing spreading condition and, if desired, other tools may be applied until the entire casing is held in spread condition. It is contemplated that not more than three or four tools would be required to spread a tire casing entirely around its bead formation.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A tool for spreading tire casings comprising an elongated shaft having a transversely extending notch in one end and a handle formation at its other end, a lever having a bifurcated end pivotally secured at said end to said shaft intermediate the length of the latter and having a transversely extending notch in its other end, the notched ends of said shaft and said lever being adapted to engage the opposite bead formations of a tire casing, and a bail pivotally connected at one end to said shaft at a location spaced from the pivotal connection between said lever and said shaft in a direction away from the notched end of said lever, said bail extending around said lever and said lever having a groove in one side near the notched end thereof receiving the other end of said bail to lock said lever in casing spreading position relative to said shaft, the pivotal connection between said lever and said shaft being spaced from the notched end of said shaft a distance substantially equal to the length of said lever and said lever having a length slightly greater than one half the distance between the beads of a tire casing when the casing is in spread condition.

WARREN R. PERRY.

References Cited in the file of this patent

UNITED STATES PATENTS

| Number | Name | Date |
|---|---|---|
| 301,881 | Goodloe | July 15, 1884 |
| 1,269,585 | Dutcher | June 18, 1918 |
| 1,964,602 | Schumacher | June 26, 1934 |
| 2,042,312 | Huebner | May 26, 1936 |

FOREIGN PATENTS

| Number | Country | Date |
|---|---|---|
| 412,092 | Germany | Apr. 15, 1925 |